United States Patent
Faust et al.

[11] Patent Number: 6,116,102
[45] Date of Patent: Sep. 12, 2000

[54] SEAT TESTING BODY FOR VIBRATION MEASUREMENTS ON SEATS

[75] Inventors: Eberhard Faust; Karl Pfahler, both of Stuttgart; Gunter Stellmach, Bad Duerrheim, all of Germany

[73] Assignee: DaimlerChrysler AG, Stuttgart, Germany

[21] Appl. No.: 09/256,090

[22] Filed: Feb. 24, 1999

[30] Foreign Application Priority Data

Feb. 24, 1998 [DE] Germany .......................... 198 07 751

[51] Int. Cl.⁷ ...................................................... G01M 7/02
[52] U.S. Cl. ............................................. 73/866.4; 73/570
[58] Field of Search .................................. 73/866.4, 493, 73/579, 669, 570

[56] References Cited

U.S. PATENT DOCUMENTS

| | | | |
|---|---|---|---|
| 5,259,765 | 11/1993 | Richards | 73/866.4 |
| 5,465,469 | 11/1995 | Sakai et al. | 73/589 |
| 5,703,303 | 12/1997 | Stewart | 73/866.4 |
| 6,009,750 | 1/2000 | Maurer et al. | 73/172 |

FOREIGN PATENT DOCUMENTS 41 03 374 C1   9/1992   Germany .
536506   1/1997   Russian Federation .

*Primary Examiner*—John E. Chapman
*Attorney, Agent, or Firm*—Evenson, McKeown, Edwards & Lenahan, P.L.L.C.

[57] ABSTRACT

A seat testing body measures vibration on seats. The body has simulated buttocks, which point downwards in the testing position and can be placed on a seat cushion of a seat to be tested, and a simulated back which is connected therewith and in the testing position can be placed against the backrest cushion of a seat to be tested. The seat testing body, with respect to its underside shape and the softness to this extent, with respect to its weight and the resulting sitting pressure distribution, corresponds approximately to the respective criteria of a person of an average weight. In order to realistically simulate with such a seat testing body the vibration action of human beings independently of the seat construction and the seat position, particularly to be able to quantitatively correctly reflect that reality in the higher-frequency range, a three-dimensionally vibratory spring damper mass system is mounted on the seat testing body. At least one vibrating mass is surrounded by a spring damper medium such that it can vibrate in all three directions in space.

5 Claims, 3 Drawing Sheets

SEAT TESTING BODY FOR VIBRATION MEASUREMENTS ON SEATS

This application claims the priority of 198 07 751.3-52, filed Feb. 24, 1998, the disclosure of which is expressly incorporated by reference herein.

BACKGROUND OF THE INVENTION

The present invention relates to a seat testing body for vibration measurements on seats, having simulated buttocks which point downwards in the testing position and can be placed on a seat cushion of a seat to be tested, and a simulated back which is connected therewith and, in the testing position, can be placed against the backrest cushion of a seat to be tested. The seat testing body, with respect to its weight and its mass distribution, corresponds approximately to the sitting weight and the mass distribution of a person of an average weight.

When seats, particularly vehicle seats are developed, a high sitting comfort is important because, particularly when vehicle seats are involved, the occupants and mainly the driver may have to stay in the seat for many hours while not being able to move very much. Among other things, questions concerning a good vibration performance of the seat are also significant here. In the course of the development of a seat, different seat and cushioning constructions are produced as testing specimens, and these must be objectively and reproducibly compared with one another with respect to various testing and evaluation criteria so that then the best testing specimen can be selected. Not only new testing specimens of a current seat development stage but also various test seats of other provenances, such as seats of earlier generations, used seats or seats from outside development or manufacturing facilities of any pairing are compared with one another.

For vibration tests, the seat with a testing person sitting therein or with a seat testing body placed thereon is excited to carry out vertical vibrations and the response vibrations of the testing body or of the testing person are measured. During the vibration measurements, flat cushion-shaped acceleration sensors are placed in the contact zone of the buttocks with the surface of the seat cushion and this vibration is measured as the response vibration. The obtained response vibrations are entered in a diagram as a spectral distribution of the vibration amplitudes relative to the corresponding excitation amplitude. The so-called transmission curves—starting with a very slow quasi-static excitation—are determined into the range of approximately 30 Hz. Typically, these transmission curves start at a value of 1.0 and then have a clear resonance point in the range of approximately 5 Hz. Then they, as a rule, fall clearly below the value of 1 and fall slightly, in a range of the seat damping, with an increasing excitation frequency.

DE 41 03 374 C1 describes a seat testing body which consists of several vertically vibratory, damped spring/mass systems for the simulation of the vertical vibration tendency of body members and body regions. The weight and the mass distribution of the spring/mass systems correspond approximately to the sitting weight of a person of an average weight. Before the vibration test of a seat with the known seat testing body, this body is placed loosely on the seat cushion of the seat and is placed against the backrest cushion.

Comparative measurements have been carried out by the assignee of this application with the known seat testing bodies, on one hand, and human testing persons, on the other hand, on various seats. The comparison of the measurements demonstrates that only in the range of the resonance step-up do the measurements result in correct information and even there only in information which is tendentiously correct. The resonance step-up determined by the assignee with the known seat testing body quantitatively did not correspond to the values measured with human testing persons. In the assignee's experience, the measuring results of the known seat testing body are even less comparable in the range of the seat damping. That is, the transmission curve determined with the seat testing body rises above approximately 7 Hz and reaches even excess values toward the end of the measuring range, which are partially clearly above the resonance step-up, whereas the testing person measurements showed a drop of the transmission values to below 0.5. A comparison between a well damping seat and a less well damping seat shows that the known seat testing body furnishes useful measuring values not even tendentiously. This comparison demonstrates that, at least according to the assignee's experiences, the known seat testing body supplies information which can be compared only to a very limited degree with the information supplied with testing person measurements and cannot replace this type of measurements. Vibration tests of seats could therefore only be carried out by using human testing persons. This naturally requires high expenditures with respect to time and personnel and can also hardly be expected.

The seat testing body described in DE 41 03 374 C1 is based on a uniaxial impedance model of the human being according to DIN 45 676. The known seat testing body disadvantageously supplies values only in the vertical position and during uniaxial vibrations in the vertical direction. It fails to stimulate a realistic seat position and real vibrations which are always three-dimensional.

SUMMARY OF THE INVENTION

An object of the present invention is to provide a seat testing body so that the vibration action of human beings can be simulated close to reality independently of the seat construction and the seat position. In particular, the vibration action in the higher-frequency range is to be reflected in a quantitatively correct manner.

According to the invention, this object has been achieved with a seat testing body for vibration measurements on seats, the body having simulated buttocks, which point downwards in the testing position and can be placed on a seat cushion of a seat to be tested, and having a simulated back which is connected therewith and in the testing position can be placed against the backrest cushion of a seat to be tested, the seat testing body, with respect to its underside shape and the softness to this extent, with respect to its weight and the resulting sitting pressure distribution, corresponding approximately to the respective criteria of a person of an average weight, and a three-dimensionally vibratory spring damper mass system being mounted on the seat testing body, in which at least one vibrating mass is surrounded such by a spring damper medium that it can vibrate in all three directions in space.

In contrast to the spring damper mass systems used in the seat testing body in DE 41 03 374 C1, a seat testing body constructed according to the present invention permits the vibrating mass to vibrate in all three spatial directions. As a result, the vibration action of a testing person can be precisely reflected. The entering of two or more vibrating masses in a spring damper medium improves the value of the information of the carried-out vibration measurements because it permits a more realistic simulation of a human testing person.

One embodiment of the invention is characterized in that a spring damper mass system is mounted on the seat testing body such that the vibrating mass is in the range of the center of gravity of the body of a sitting person. This solution is simple and nevertheless supplies useful results.

A further embodiment of the invention is characterized in that two spring damper mass systems are mounted on the seat testing body such that the vibrating mass of one spring damper mass system is situated in the region of the center of gravity of the upper body and the vibrating mass of the other spring damper mass system is situated in the region of the center of gravity of the lower body of a sitting person. As a result, the vibration action of a sitting person can be simulated more realistically.

Another embodiment of the invention utilizes a third spring damper mass system mounted in the region of the center of gravity of the head of a sitting person. The third spring damper mass system simulates the vibration action of the neck-throat region. The third spring damper mass system may be coupled with the back region of the seat testing body by a joint.

Another embodiment of the invention uses different materials as the spring damper medium in a spring damper mass system. This spring damper medium consists of an elastic material with a defined self-damping, such as rubber, foam, an elastomer, etc. In the simplest construction, the vibrating mass is surrounded by a homogeneous foamed-material body. The foamed-material body may, however, also have different spring and damping characteristics in different partial zones. By using different materials, the vibrating characteristics of different persons can be reflected. A number of seat testing bodies may, for example, be produced which correspond to a representative group of drivers. This permits reproducible, always repeatable vibration measurements independently of the availability and the daily condition of testing persons.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
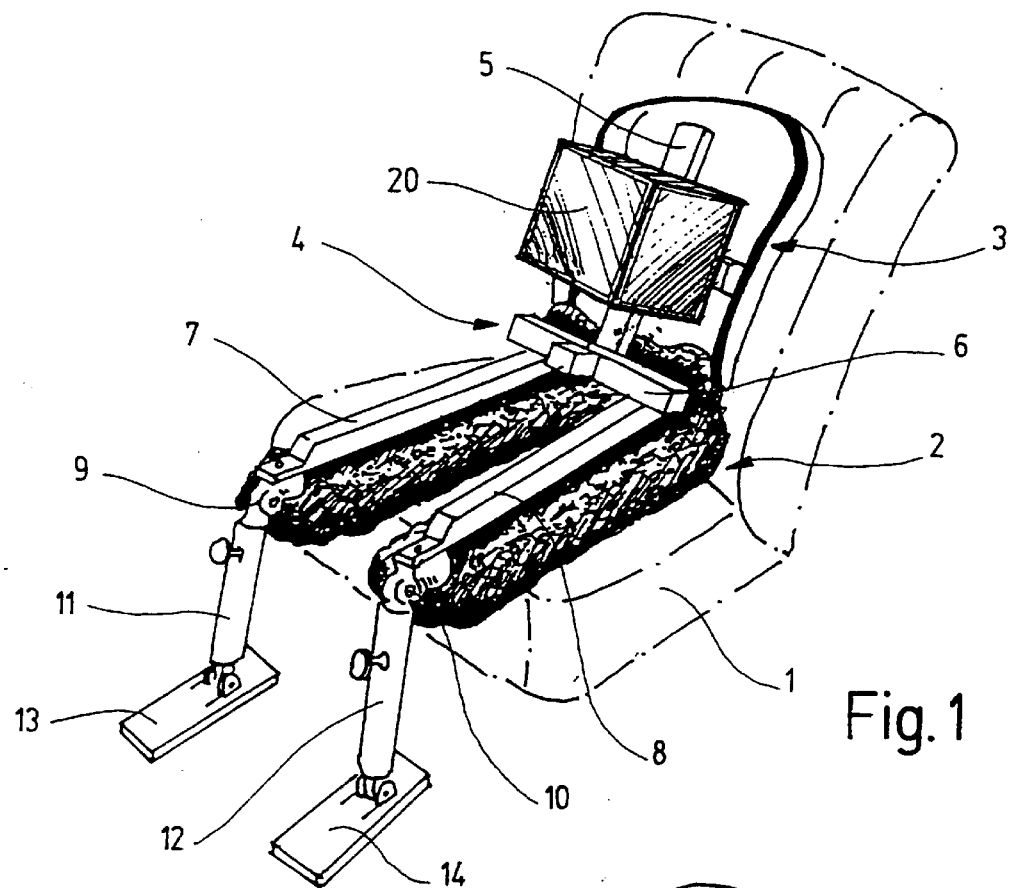
FIG. 1 is a view of a seat testing body placed in a vehicle seat according to a first embodiment of the invention.

FIG. 1 illustrates a seat testing for vibration measurements on a vehicle seat outlined by a dash-dotted line. It has simulated buttocks 2 which point downward in the testing position and can be placed on the seat cushion of the seat to be tested, and a simulated back 3 connected therewith which can be placed against the backrest cushion of the seat in the testing position. With respect to its weight and its mass distribution, the seat testing body corresponds approximately to the sitting weight and the mass distribution of a person of an average weight.

In order to be able to carry out vibration measurements on seats, particularly vehicle seats, with this seat testing body, whose measuring results are at least comparable in the whole spectral range, that is, from almost 0 to approximately 30 Hz, quantitatively and qualitatively to corresponding testing person measurements, the simulated buttocks 2 and the simulated back 3 of the seat testing body are each formed by padded hard parts. The hard parts, and particularly the soft parts, are being anthropomorphically designed so that the seat testing body is vibrationally coupled to the seat cushion and the backrest cushion as true to nature as possible. The transition from the cushions into the seat testing body vibrationally must be simulated as precisely as possible to the natural "interface" between the human being and the seat.

With respect to the layer thickness, the softness, the elasticity and the damping action as well as the local distribution of these parameters, the padding of the hard parts of the simulated buttocks 2 anthropomorphically simulates the soft parts in the buttocks region, specifically the muscle tissue, the connective tissue and the fatty tissue. Mainly because of the hard parts of the buttocks and their padding, the two sitting pressure points of human buttocks and their closer surroundings are simulated as true to nature as possible with respect to the shape, the position, the hardness and the local hardness distribution, to the skeletal parts and soft parts.

For illustrating the padding of the hard parts of the buttocks and/or back, several elastic soft foam layers of different thicknesses and/or different densities and elasticities are applied. The foamed-material layers which are closer to the hard part and cover more area are stronger and specifically lighter and softer than the foamed-material layers which are situated farther toward the outside and cover less area. The padding can be covered with a layer of soft leather and/or with a trouser-type fabric which acts similarly to human skin with respect to its flexibility. The precise design of the padding and the construction of the seat testing body are not directly pertinent to the present invention but are in any event described in published DE 197 20 854 C1 on 10.8.98 to which reference is made here with respect to further details.

The simulated buttocks 2 and the simulated back 3 of the seat testing body are mounted on a skeleton 4 which simulates the human skeleton. The skeleton 4 comprises a simulated spinal column 5 which changes over into a simulated pelvis 6. Simulated thighs 7, 8 start out from the simulated pelvis 6. The simulated thighs 7, 8 are connected with simulated lower legs 11 and 12 simulated knee joints 9 and 10. The simulated lower legs 11 and 12 are connected with the simulated feet 13, 14 by way of simulated ankle joints. A spring damper mass system 20 is mounted on the simulated spinal column 5 in the center of gravity of a sitting person.

Figure 2:
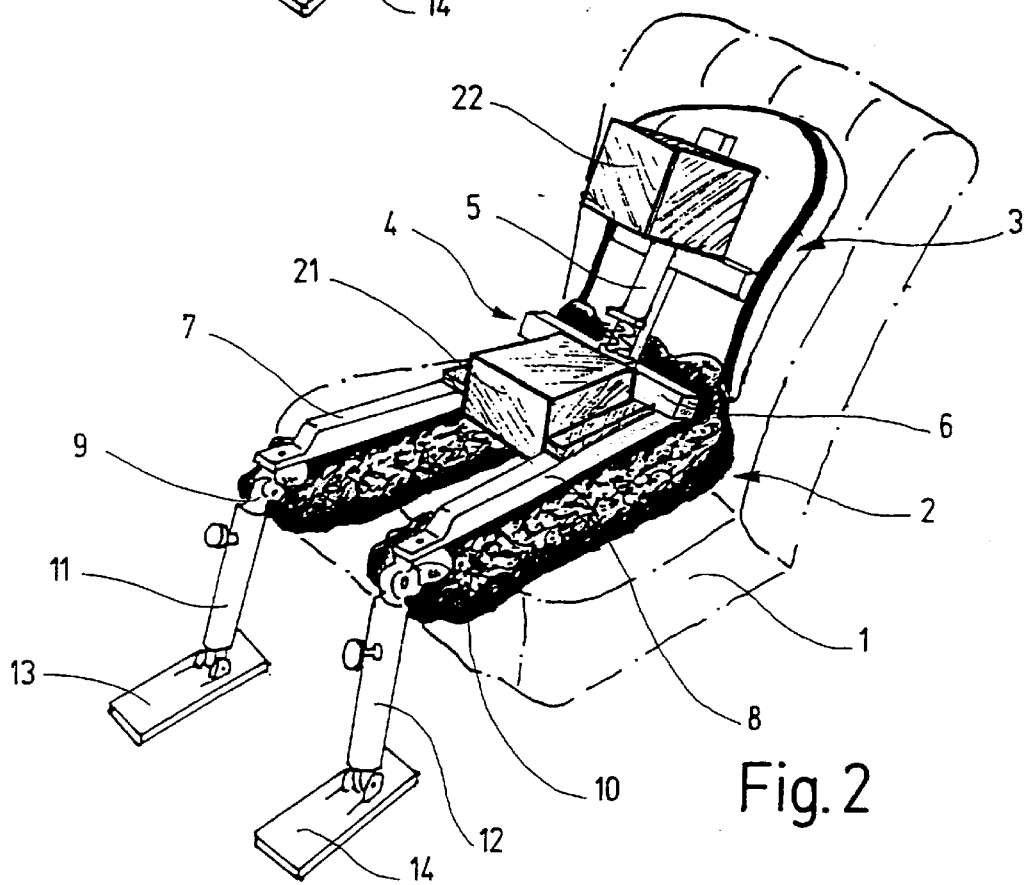
FIG. 2 is a view of a seat testing body placed in a vehicle seat according to a second embodiment of the invention.

In the seat testing body illustrated in FIG. 2, two spring damper mass systems 21, 22 are provided. The spring damper mass system 21 is mounted in the center of gravity of the lower body of a sitting human being on the simulated thighs 7, 8. The spring damper mass system 22 is mounted in the center of gravity of the upper body of a sitting person on the simulated spinal column 5.

Figure 3:
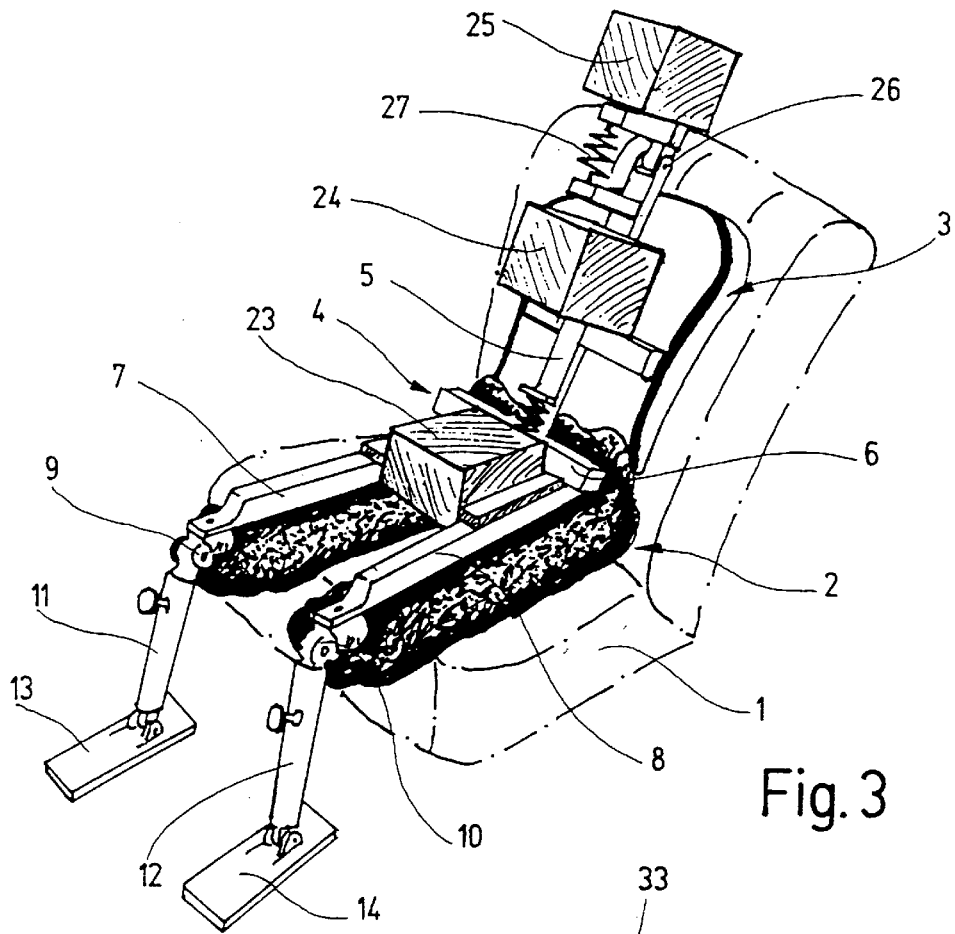
FIG. 3 is a view of a seat testing body placed in a vehicle seat according to a third embodiment of the invention.

In the seat testing body illustrated in FIG. 3, three spring damper mass systems 23, 24 and 25 are provided. The spring damper mass system 23 is mounted in the center of gravity of the lower body of a sitting person on the simulated thighs 7, 8. The spring damper mass system 24 is mounted in the center of gravity of the upper body of a sitting person on the simulated spinal column 6. The spring damper mass system 25 is mounted in the center of gravity of the head of a sitting person. The spring damper mass system 25 simulates the vibration action of the head-neck region of a sitting person. The spring damper mass system 25 is coupled by way of a joint 26 and a spring 27 with the simulated spinal column 5.

As illustrated in FIGS. 4 to 8, the spring damper mass systems 20 to 25 can have different constructions within the scope of the present invention.

Figure 4:
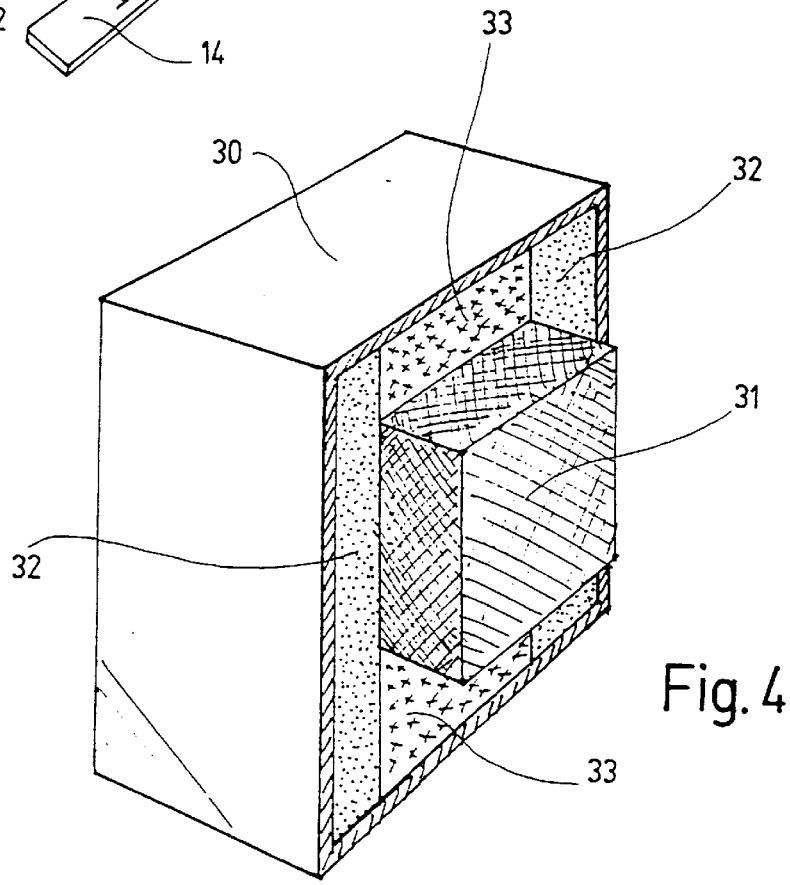
FIGS. 4 to 8 are views of various embodiments of spring damper mass systems for a seat testing body of the types illustrated in FIGS. 1 to 3.

The spring damper mass system illustrated in FIG. 4 is formed by a receptacle 30 in which a mass 31 is disposed such that it can vibrate in all three spatial directions. In order to ensure this, the vibrating mass 31 is embedded in an elastic material with a defined self-damping. It may, for example, be rubber, a foamed material or any elastomer. The material illustrated in FIG. 4 which surrounds the vibrating mass 31 has different springing and damping characteristics in the horizontal direction than in the vertical direction. These may also be different materials 32. The different materials referred to herein can be conventional rubbers and foam plasters for their known specific spring and damping characteristics.

Figure 5:
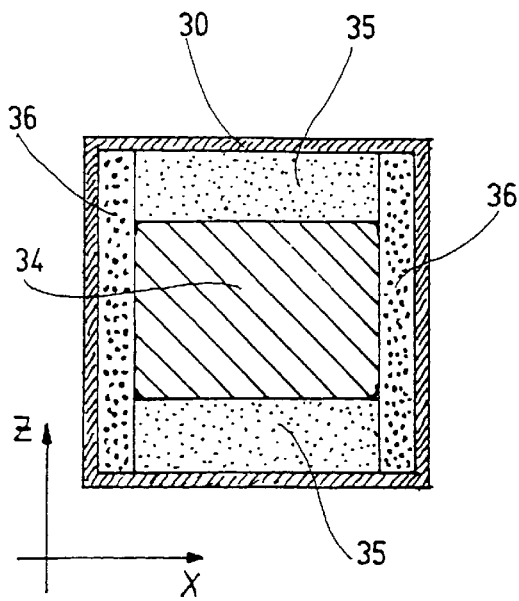
Figure 6:
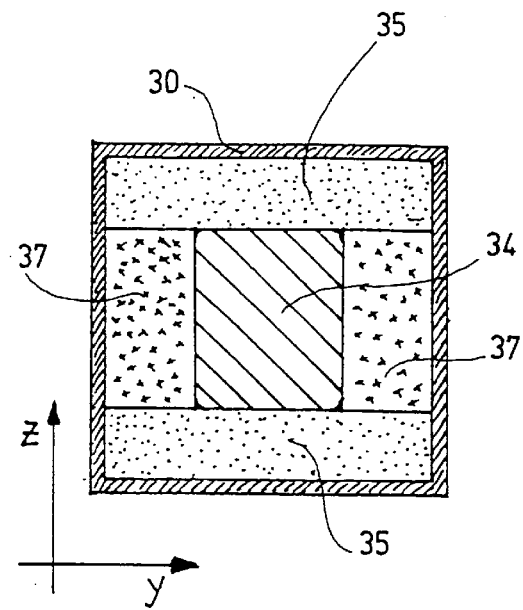

In FIG. 5, a vibrating mass 34 is embedded between different materials. A first material 35 is effective in the z-direction and a second material 36 is effective in the x-direction. FIG. 6 illustrates that, in the case of the same spring damper mass system, a third material 37 becomes effective in the y-direction. This means that a different material interacts with the vibrating mass 34 in all three directions in space.

Figure 7:
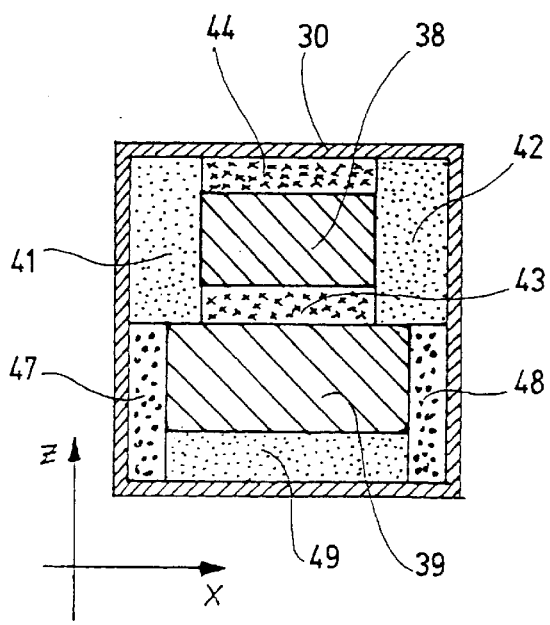
Figure 8:
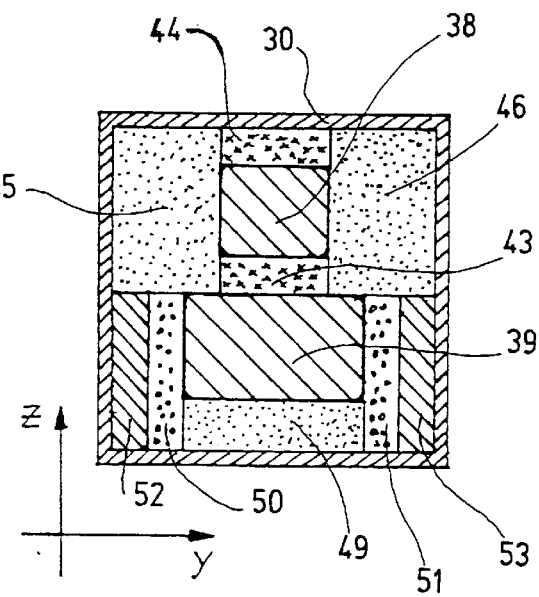

In FIG. 7, two different vibrating masses 38, 39 are housed in the receptacle 30. Similar to the situation illustrated in FIGS. 5 and 6, the vibrating masses 38, 39 are embedded between different materials. As illustrated in FIG. 7, the vibrating mass 38 is surrounded in the x-direction by two blocks 41, 42 of a first material illustrated dots and is surrounded in the z-direction by two blocks 43, 44 of a second material illustrated by crosses. As illustrated in FIG. 8, in the y-direction, the vibrating mass 38 is surrounded by two blocks 45, 46 made of a first material indicated by dots.

As illustrated in FIG. 7, the vibrating mass 39 is surrounded in the x-direction by two blocks 47, 48 made of a third material. In the z-direction, the vibrating mass 39 interacts on the bottom with a block 49 of the first material and on the top with the blocks 41, 42, 45, 46 of the first material as well as with the block 43 of the second material, as illustrated in FIGS. 7 and 8. As illustrated in FIG. 8, the vibrating mass 39 is arranged in the y-direction between two blocks 50, 51 of the third material. Viewed in the y-direction, the blocks 50, 51 of the third material, in turn, are surrounded by two blocks 52, 53 of a fourth material illustrated by hatching.

The arrangements illustrated as examples in FIGS. 4 to 8 can simulate the vibration action of testing persons very well.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Seat testing body for vibration measurements on seats, comprising simulated buttocks (2) which point downwards in a testing position and can be placed on a seat cushion of a seat (1) to be tested; a simulated back (3) which is operatively connected therewith and in the testing position can be placed against a backrest cushion of a seat to be tested, the seat testing body, with respect to an underside shape thereof and softness to this extent, with respect to its weight and a resulting sitting pressure distribution corresponding approximately to respective criteria of a sitting person of an average weight; and a three-dimensionally vibratory spring damper mass system (20–25) which is mounted on the seat testing body with at least one vibrating mass (34, 38, 39) surrounded by a spring damper medium (32, 33, 35, 36, 37) so as to vibrate in all three spatial directions.

2. The seat testing body according to claim 1, a spring damper mass system (20) is mounted on the seat testing body such that the at least one vibrating mass (34) is situated in the region of the center of gravity of the body of the sitting person.

3. The seat testing body according to claim 1, where two spring damper mass systems (21, 22, 23, 24) are mounted on the seat testing body such that the vibrating mass of one spring damper mass system (22, 24) is situated in the region of the center of gravity of the upper body and the vibrating mass of the other spring damper mass system (21, 23) is situated in the region of the center of gravity of the lower body of the sitting person.

4. The seat testing body according to claim 3, where a third spring damper mass system (25) is mounted in the region of the center of gravity of the head of a sitting person.

5. The seat testing body according claim 1, where different materials are used as the spring damper medium in a spring damper mass system (20–25).

\* \* \* \* \*